Patented June 25, 1929.

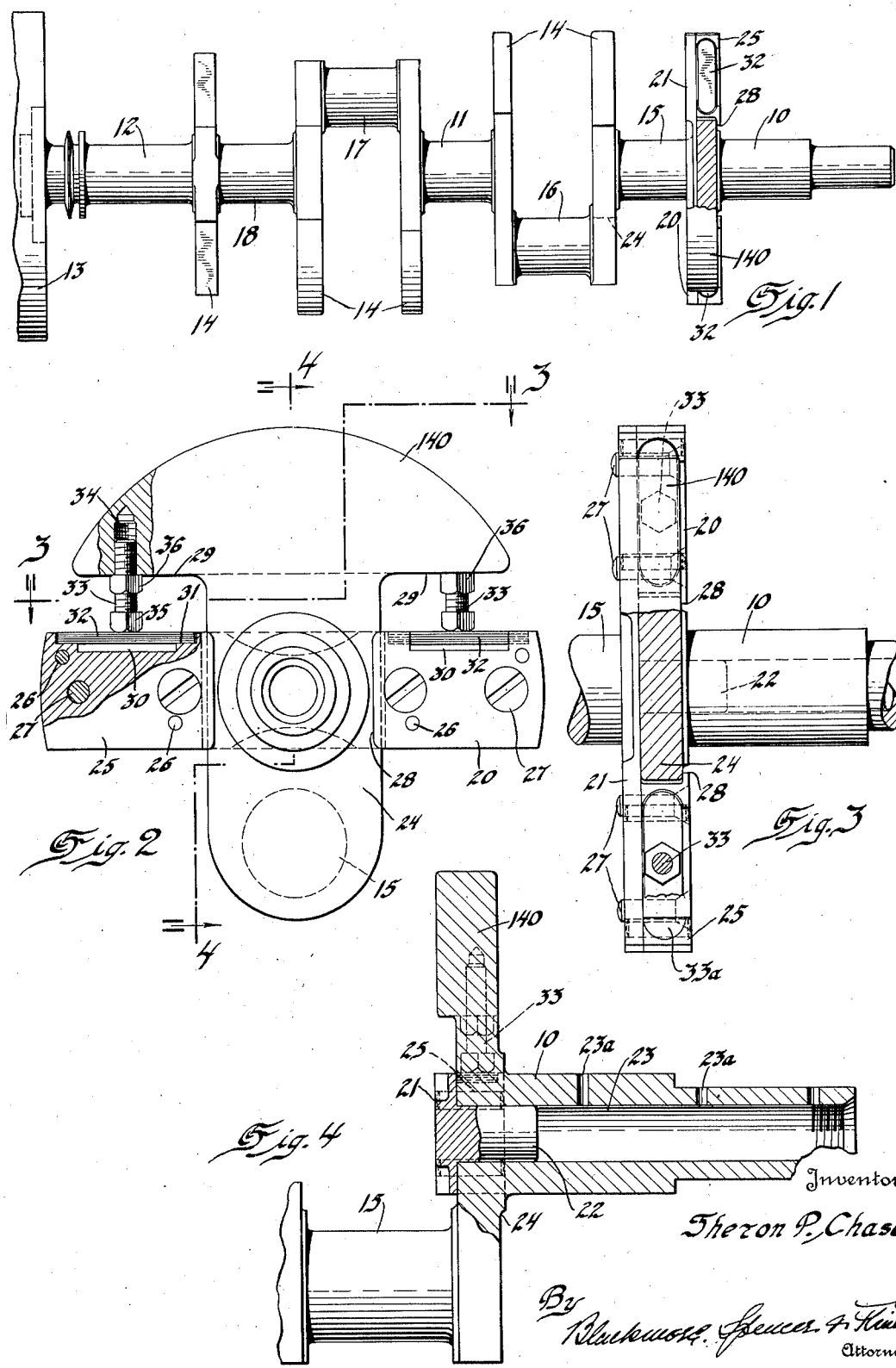

1,718,634

UNITED STATES PATENT OFFICE.

THERON P. CHASE, OF DETROIT, MICHIGAN, ASSIGNOR, BY MESNE ASSIGNMENTS, TO PACKARD MOTOR CAR COMPANY, OF DETROIT, MICHIGAN, A CORPORATION OF MICHIGAN.

TORSION BALANCER.

Application filed April 2, 1928. Serial No. 266,771.

This invention relates to means for minimizing torsional vibrations, particularly in engine crank shafts.

The invention comprises a torsion balancer having a balancing mass centered and balanced about the axis of a crank shaft, disposed substantially within the planes of one of the webs of the shaft, and elastically connected to the shaft.

The invention also consists of combinations and details of structure more specifically described hereinafter, defined in the appended claims and illustrated in the accompanying drawings, in which:

Fig. 1 is an elevation of a four-throw 90° crank shaft fully counterweighted having the balancer of this invention attached;

Fig. 2 is a view along the axis of the shaft from the front showing the balancer partly in section;

Fig. 3 is a section on the broken line 3—3 of Fig. 2;

Fig. 4 is a section along the broken line 4—4 of Fig. 2.

Fig. 1 illustrates a 90° crank shaft fully counterweighted adapted for use with 90° V-type 8 cylinder engines. The shaft is provided with three journals designated from front to rear by numerals 10, 11 and 12. A heavy balance wheel 13 is secured as usual to the rear end of the shaft. Counterweights are shown at 14 and 140, maintaining the shaft in dynamic balance. Counterweight 140 is the forward counterweight and is utilized to hold crank shaft spring abutments of the balancer. In Figure 1, this counterweight is shown fragmentarily; part having been broken away through the connecting arm. The crank pins are designated from front to rear by numerals 15, 16, 17 and 18, crank pins 15 and 18 being 180° from each other and crank pins 16 and 17, 180° from each other, but 90° from crank pins 15 and 18.

Fig. 2 shows counterweight 140 and the torsion balancer in elevation viewed from the front end of the shaft. The balancing mass 20, in the form shown, comprises a flat bar-like member 21 having a bearing stud 22 projecting from one side, this bearing stud being journalled in a bore 23 extending through the journal 10 from the front end of the shaft and opening into the space rearward of the web 24 of crank pin 15. Oil holes such as 23ª permit oil from the front bearing to pass into the bore 23 and lubricate stud 22 and the bearing surfaces of the bar 21. In order to provide sufficient mass to give an adequate moment of inertia to the balancer, the ends thereof are materially thickened. In the form shown blocks 25 are bolted to the flat bar 21, one at each side of the center. The blocks 25 may be accurately positioned and firmly held from any sliding movement on the plate 21 by means of dowels 26, and clamped securely to said plate by screws 27. Flanges 28 project inward from the forward side of the blocks 25 in such manner as to engage the forward side of web 24 in order to prevent axial displacement of the balancer. These blocks 25 are thus disposed substantially in the transverse planes occupied by web 24 and counterweight 140 so that no additional length of shaft is necessary to accommodate the balancer.

One edge of the balancing body illustrated occupies a position transverse of a line representing the direction of centrifugal force on segmental counterweight 140 and substantially parallel with the inner edge 29 thereof as shown in Fig. 2. That edge of each block 25 which is nearest to the counterweight is provided with a cavity 30 having at opposite ends seats or abutments 31 for the ends of leaf springs 32, each spring preferably consisting of several leaves. The ends of the cavities 30 for receiving the springs are preferably of semi-circular form as indicated at 33ª, the end contours of the spring leaves corresponding. The semi-circular contour of the cavity ends may thus be conveniently machined by means of an end mill and the springs may be cut by a die cutter. The springs may be dropped into the cavity and held in place by shaft-attached abutments 33 bearing on the springs between their ends, the abutments being preferably adjustable and capable of being locked in adjusted position. Said abutments 33 may be adjustably secured to the counterweight 140; they may be in the form of capstan screws threaded into cavities 34 tapped in counterweight 140, the heads 35 of the screws bearing against the springs midway of their ends. Means for locking the abutments after they have been adjusted to tension the springs properly may take the form of a lock nut 36.

It will be apparent that this balancer is particularly well adapted to shafts which are already in static and dynamic balance since it is symmetrical with respect to the shaft center. It also is adapted to be housed in the crank case and requires no lengthening of the shaft and no modification of the engine casing because it is within the same transverse space as that required for the orbit of counterweight 140 and crank pin 15. The tension of the springs may also be adjusted after assembly, if desired.

What I claim is:

1. Means for controlling torsional vibrations in torsionally elastic shafts, comprising in combination with the shaft, a balancing mass symmetrically balanced and pivoted concentrically with the axis of the shaft, said mass having an adequate moment of inertia, spring seats symmetrically disposed on opposite sides of the pivotal axis, leaf springs supported on said seats, and abutments rigid with respect to the shaft bearing upon said springs.

2. Means for controlling torsional vibrations of crank shafts counterweighted for static and dynamic balance, comprising in combination with the shaft a balancing mass symmetrically balanced and pivoted concentrically with the axis of the shaft and having an adequate moment of inertia, spring seats disposed on opposite sides of the pivotal axis, leaf springs supported on said seats, a counterweight rigid with the shaft and abutments on the counterweight bearing upon said springs.

3. Means for controlling torsional vibrations in crank shafts counterweighted for static and dynamic balance comprising the combination of a crank shaft having a bore extending axially through its forward journal and opening rearward of the front crank web, a balancing mass comprising a bar carrying a pin pivoted in said bore, said bar having thickened ends disposed symmetrically at opposite sides of the crank web, spring seats upon the balancing mass at opposite sides of its axis, springs in said spring seats, and abutments on the forward counterweight bearing upon said springs.

4. Means as defined in claim 3, in which the thickened ends of the balancing mass have flanges arranged to engage the web to prevent axial displacement of the balancing mass.

5. Means for controlling torsional vibrations, comprising a crank shaft having an axial hole opening rearward of the forward crank web, a balancing mass comprising a bar having a central stud journalled in the hole, blocks bolted to the bar on opposite sides of the crank web, and springs disposed between the balancing mass and a part rigid with the shaft.

6. Means for controlling torsional vibrations, comprising a crank shaft having a hollow journal and an oil hole extending from the exterior to the interior of said journal, of an elastically mounted balancing mass having a stud extending into the hollow journal and lubricated by oil from the bearing.

7. The combination of a crank shaft with a torsional balancer symmetrically balanced about the axis of the shaft and substantially within the orbit traversed by one of the crank webs.

In testimony whereof I affix my signature.

THERON P. CHASE.